US008515869B2

(12) United States Patent
Ghafoor et al.

(10) Patent No.: US 8,515,869 B2
(45) Date of Patent: Aug. 20, 2013

(54) SELF-SERVICE TERMINAL (75) Inventors: Gameelah Ghafoor, Dundee (GB); Ahmar Ghafoor, Dundee (GB); Marie Macintyre, Edinburgh (GB); Anthony S. Holmes, Dundee (GB)

(73) Assignee: NCR Corporation, Duluth, GA (US)

( * ) Notice: Subject to any disclaimer, the term of this patent is extended or adjusted under 35 U.S.C. 154(b) by 4604 days.

(21) Appl. No.: 10/051,355

(22) Filed: Jan. 18, 2002

(65) Prior Publication Data

US 2002/0128970 A1 Sep. 12, 2002

(30) Foreign Application Priority Data

Jan. 20, 2001 (GB) .................................. 0101498.4
Jun. 4, 2001 (GB) .................................. 0113471.7

(51) Int. Cl.
*G06Q 40/00* (2012.01)
(52) U.S. Cl.
USPC ................... 705/43; 705/35; 705/16; 705/21; 705/417; 701/117; 701/201
(58) Field of Classification Search
USPC ..................... 701/117, 201; 705/43, 417, 38, 705/35, 1, 16, 21; 340/5.8, 5.41; 235/379
See application file for complete search history.

(56) References Cited

U.S. PATENT DOCUMENTS

| 5,714,741 | A | | 2/1998 | Pieterse et al. |
| 5,731,575 | A | * | 3/1998 | Zingher et al. ................ 235/379 |
| 5,878,337 | A | | 3/1999 | Joao et al. |
| 5,914,472 | A | * | 6/1999 | Foladare et al. ............... 235/380 |
| 6,175,922 | B1 | | 1/2001 | Wang |
| 6,327,348 | B1 | * | 12/2001 | Walker et al. ............... 379/91.01 |
| 6,430,496 | B1 | * | 8/2002 | Smith et al. .................... 701/117 |
| 7,194,414 | B1 | * | 3/2007 | Savage et al. .................... 705/64 |
| 7,542,944 | B1 | * | 6/2009 | Drummond et al. ............ 705/43 |
| 2001/0056402 | A1 | * | 12/2001 | Ahuja et al. .................... 705/43 |
| 2004/0124966 | A1 | * | 7/2004 | Forrest ........................... 340/5.8 |
| 2007/0174080 | A1 | * | 7/2007 | Outwater ........................ 705/1 |

FOREIGN PATENT DOCUMENTS

| EP | 0 884 703 A2 | 5/1998 |
| EP | 0 933 733 A2 | 8/1999 |
| EP | 1 067 492 A2 | 6/2000 |
| EP | 1 136 962 A2 | 2/2001 |

(Continued)

OTHER PUBLICATIONS

Dispensing The Future, May 1997, Lafferty Publications Ltd, Electronic Payments International, n 119, p. 12 & ff.*

*Primary Examiner* — Charles Kyle
*Assistant Examiner* — Siegfried E Chencinski
(74) *Attorney, Agent, or Firm* — Paul W. Martin; Peter H. Priest (57) ABSTRACT

An Automated Teller Machine, ATM. Persons with physical disabilities sometimes have difficulty negotiating an ATM. Under the invention, two persons are involved in an ATM transaction. One person is equipped with a communicator, such as a cell phone, which contacts an ATM. That person enters necessary transaction data, such as a PIN, a desired cash amount, and so on, using the cell phone. The other person collects the cash dispensed, and any documents, at the ATM itself. This approach eliminates a need for one person to entrust an ATM card and PIN to another person. In another embodiment, the person located at the ATM was previously given a token or passcard by the customer. That person presents the token to the ATM, which prompts the ATM to call the cell phone of the customer, thereby initiating the transaction.

19 Claims, 5 Drawing Sheets

(56) References Cited

FOREIGN PATENT DOCUMENTS

| GB | 2 352 313 A | 1/2001 |
| WO | WO 00/49547 A | 8/2000 |
| WO | WO 01/03080 A1 | 1/2001 |

* cited by examiner

PLEASE ENTER CARD

FIG. 4B

REMOTE TRANSACTION IN PROGRESS

PLEASE WAIT

FIG. 4C

PLEASE COLLECT YOUR CARD AND YOUR CASH

FIG. 4D

TRANSACTION NOT AUTHORISED

PLEASE REMOVE CARD

SELF-SERVICE TERMINAL

BACKGROUND OF THE INVENTION

The present invention relates to a self-service terminal (SST) and to a method of operating an SST. In particular, the invention relates to an automated teller machine (ATM), and to a method of operating an ATM.

ATMs provide users with a convenient source of cash in an unattended environment. However, to benefit from this convenience a user must be able physically to access an ATM, and must also be able to input data requested by the ATM such as a personal identification number (PIN), an amount of cash to be withdrawn, and such like data. As a result, certain people are not able to use ATMs, for example, because they are confined to a home, because they have a visual impairment, because an ATM is located in an area that is not physically accessible for them, or such like reason.

To overcome this problem, some people entrust their ATM card and PIN to a third party for conducting transactions on their behalf; but this is undesirable because it may lead to fraud, for example, if the third party withdraws more money than they are asked to withdraw, or if the third party makes unauthorized withdrawals.

SUMMARY OF THE INVENTION

It is among the objects of an embodiment of the present invention to obviate or mitigate one or more of the above disadvantages, or other disadvantages associated with conventional SSTs.

According to a first aspect of the present invention there is provided a self-service terminal having a user interface including means for identifying a user, characterized in that the terminal includes means for obtaining contact information for a communications device associated with a user; and contact means for establishing a link with the communications device to allow a transaction to be entered thereby.

Preferably, an entire transaction is entered using the communications device, where an entire transaction includes entry of an identification, such as a PIN, and entry of transaction data, such as an amount of money to be withdrawn.

The communications device is retained by a user, and is used as an alternative to any input device on the SST, such as a keypad, touchscreen, function display keys (FDKs), or such like. Thus, the communications device is used as an alternative input means.

In one embodiment, the communications device is located remotely from the SST during a transaction. This allows a person ("the user") to enter a transaction at a remote location while another person, who is located at the SST, receives any item dispensed from the SST as a result of the transaction entered by the user.

By virtue of this embodiment of the invention an account holder ("the user") who is unable to access or use an ATM is able to provide a third party with a token that the third party presents to the ATM. The account holder ("the user") is contacted by the ATM when a transaction is to be entered. The account holder can then enter a security code (such as a PIN) and transaction details (such as withdraw twenty pounds sterling). This enables an account holder to allow a third party to collect money or other media from their account using an ATM, without having to divulge a PIN or other security code to the third party, thereby minimizing the potential for abuse of trust.

In another embodiment, the communications device is located locally at the SST during a transaction so that the person who operates the communications device ("the user") is the person who receives any item dispensed from the SST as a result of the transaction.

By virtue of this embodiment of the invention, a self-service terminal is operable to identify a user and to dial a user's telephone so that the user can enter a transaction using the telephone rather than the terminal's user interface. One advantage of this embodiment of the invention is that the user does not have to determine the telephone number of the SST, because the SST calls the user's communications device once the user has been identified. For a visually-impaired user who has no difficulty in physically accessing an SST, this obviates any requirement for a third party to assist with a transaction.

It will be appreciated that "the user" referred to herein is the person who operates the communications device, not necessarily the person who is located at the SST.

Preferably, the communications device is in the form of a telephone, such as a cellular telephone (for use in entering a transaction either locally at an SST or remotely from an SST) or a landline telephone (for use in entering a transaction remotely from an SST). Alternatively, the communications device is in the form of a computing device having a modem. Typical computing devices include a personal computer (PC), a pocket computer, a personal digital assistant, and such like.

Preferably, the means for identifying a user comprises a module (such as a card reader) for receiving a physical identification token (a claimed identity), which is used in conjunction with an identity verifier, such as a personal identification number (PIN). Suitable card readers include a magnetic stripe card reader and a smart card reader. Other identification tokens may be used, such as a smart ring, smart button, personal digital assistant, or cellular telephone. Alternatively, in embodiments where the user is always located in the vicinity of the SST, the means for identifying a user may comprise a recognition module (such as a biometrics unit) for receiving a token derived from part of a user's body. Suitable biometrics units include a human iris recognition unit, a fingerprint sensing unit, a facial recognition unit, a voice recognition unit, and such like.

The means for obtaining contact information for a communications device associated with a user may be implemented by a controller accessing a database of stored telephone numbers. Alternatively, the telephone number may be retrieved from a user identification token (for example, the telephone number may be stored on a user's card), so the means for obtaining contact information may be implemented by a token reader (such as a card reader).

The database stores a user identifier and a telephone number or numbers associated with that user. Where more than one telephone number is stored, an algorithm or rules engine may be used to determine which number is to be called, or the numbers may be called in a predetermined order or in an order determined by the rules engine.

The database may be stored on the SST, partially on the SST (for example, in a distributed storage arrangement), or in a remote repository.

The contact means may contact the communications device directly, for example, by dialing a telephone number associated with the communications device. Alternatively, the contact means may contact the communications device indirectly, for example, by requesting a remote center to contact the communications device. The remote center may be a transaction host.

The contact means may be implemented by a transceiver, such as a cellular radio-frequency transceiver.

The self-service terminal may be an ATM.

According to a second aspect of the present invention there is provided a method of operating a self-service terminal having a user interface, the method including the step of identifying a user, and being characterized by the further steps of: obtaining contact information for a communications device associated with the identified user, and establishing a telecommunications link with the communications device so that a transaction may be entered via the link.

The step of identifying a user is preferably implemented by receiving an identity token. An identity verifier, such as a PIN or code, may be requested by the terminal after the link has been established so that the person presenting the claimed identity does not need to be aware of the identity verifier.

According to a third aspect of the present invention there is provided a self-service terminal system comprising a host and at least one self-service terminal, each terminal having a user interface including transaction entry means and means for identifying a user, characterized in that the system includes means for obtaining contact information for a communications device associated with a user, and contact means for contacting the communications device to allow a transaction to be entered thereby.

According to a fourth aspect of the present invention there is provided a self-service terminal for visually impaired users, the terminal comprising means for identifying a user, and means for contacting a communications device associated with that user, whereby a user may operate the terminal using the communications device.

According to a fifth aspect of the present invention there is provided a self-service terminal having a user interface including transaction entry means and a token reader for reading an identification token, characterized in that the terminal is operable to read a token indicating that a transaction is to be entered using remote entry means, and includes contact means for contacting the remote entry means to allow a transaction to be entered thereby.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
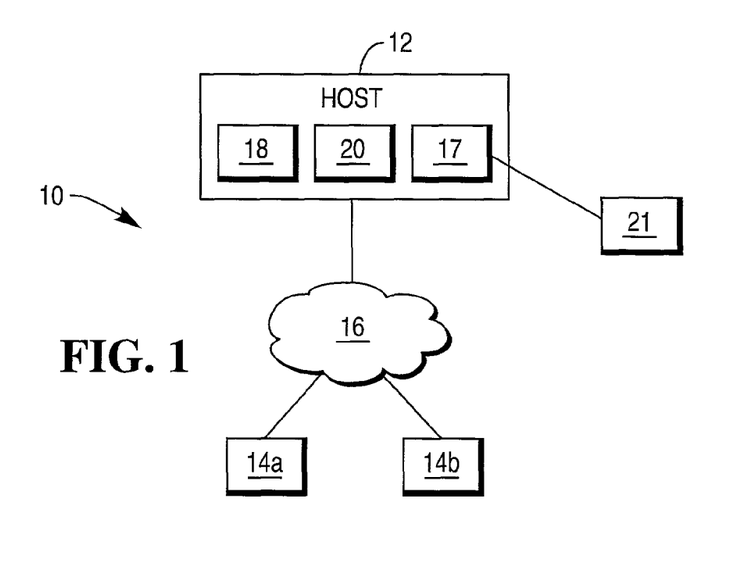
FIG. 1 is a block diagram of a self-service terminal system according to one embodiment of the present invention.

Reference is now made to FIG. 1, which is a block diagram of a self-service terminal system 10 according to one embodiment of the present invention. The system 10 is owned and operated by a financial institution and comprises a host 12 interconnected to a plurality of SSTs 14 (only two, 14a and 14b, are shown) by a secure network 16. The SSTs 14 are ATMs. The host 12 includes a communication interface 17, an authorization facility 18 and a back-office facility 20.

The authorization facility 18 authorizes transaction requests received from ATMs via the network 16. The authorization facility 18 also authorizes transaction requests received from Point of Sale terminals (not shown) and other ATM networks (not shown).

The back-office facility 20 maintains records for every account maintained by the financial institution. Each record includes a list of all the transactions executed relating to that account. Typical transactions include: direct credits, direct debits, checks, cash withdrawals, and such like. The back-office facility 20 provides (typically on a daily basis) the transaction authorization facility 18 with account information for each account maintained by the financial institution.

The ATMs 14 are physically remote from each other, but are shown in proximity in FIG. 1 for clarity. FIG. 1 also shows a remote entry means 21 (also referred to herein as a communications device) in the form of a cellular telephone which can be accessed by the communication interface 17, as described in more detail below.

Figure 2:
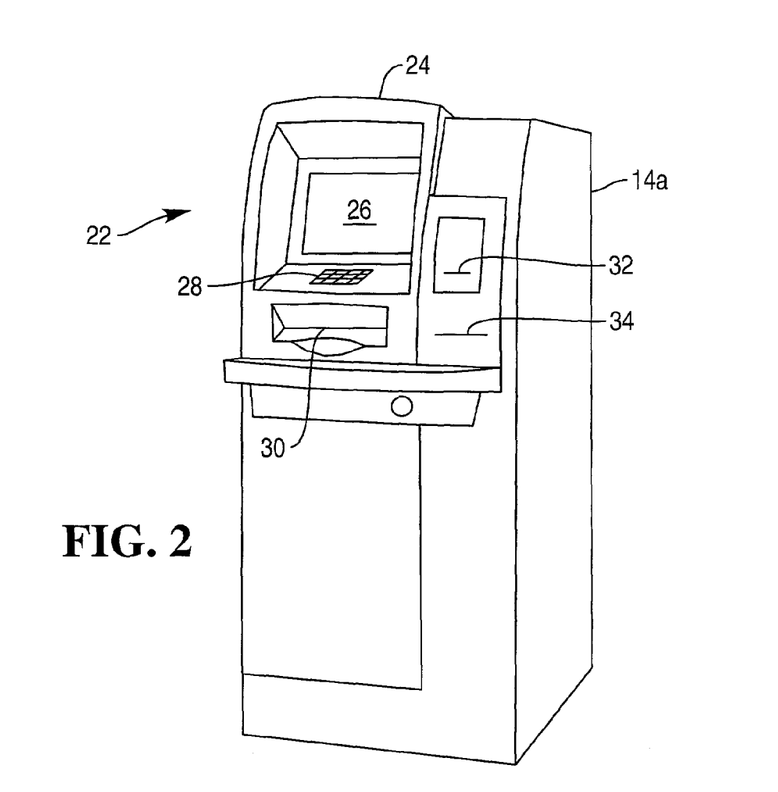
FIG. 2 is a schematic perspective view of one of the terminals of FIG. 1.

Reference is now made to FIG. 2, which is a perspective view of one of the ATMs 14 of FIG. 1. Each ATM 14 has a user interface 22 located within a molded fascia 24. The user interface 22 comprises: a display 26, local entry means 28 in the form of an encrypting keypad, a cash dispense slot 30, a card entry/exit slot 32, and a receipt slot 34.

Figure 3:
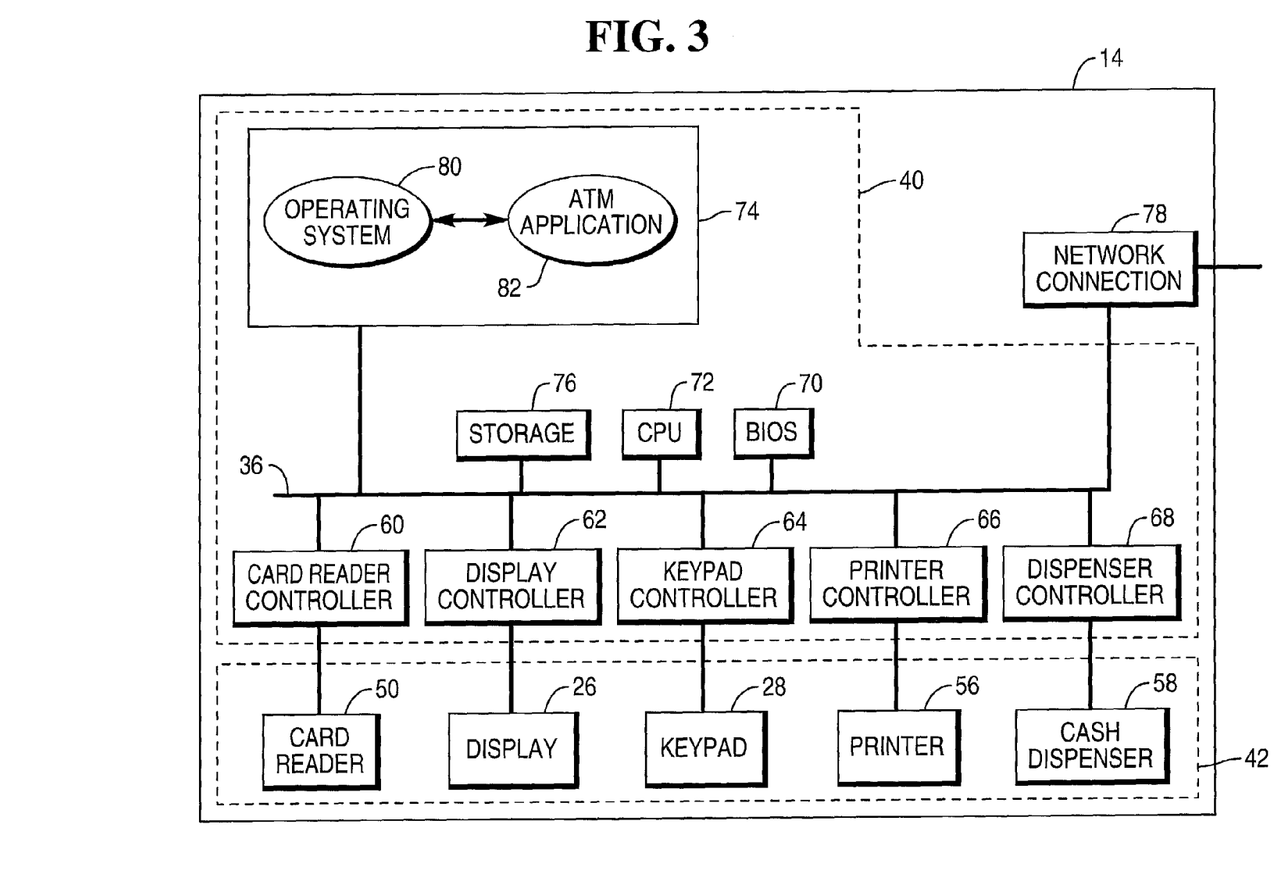
FIG. 3 is a simplified block diagram of the architecture of the terminal of FIG. 2.
Figure 4A:
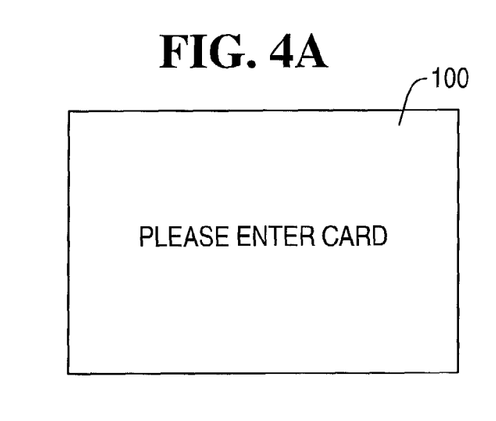
FIGS. 4a to 4d illustrate screens presented to a person located at one of the terminals of FIG. 1 during a transaction.
Figure 4B:
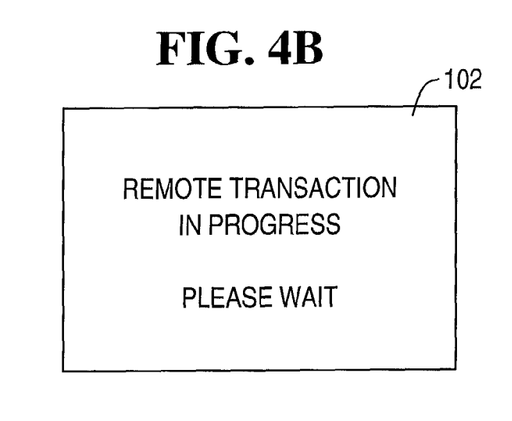
Figure 4C:
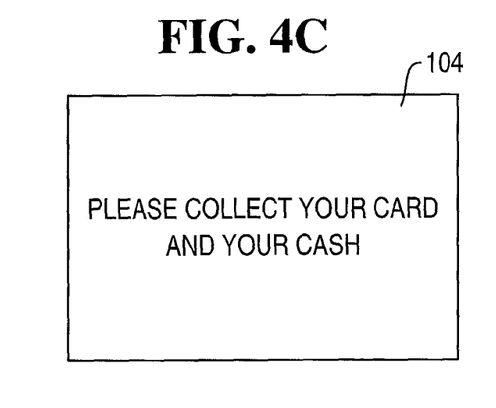
Figure 4D:
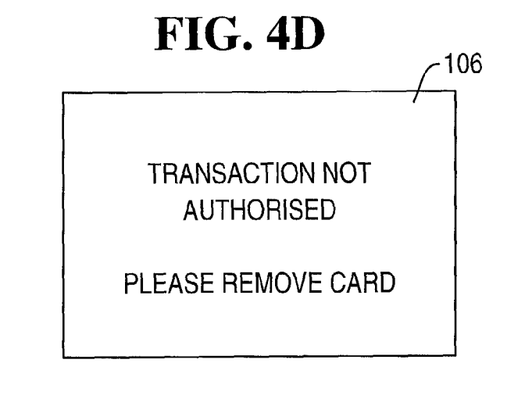

Reference is now made to FIG. 3, which is a simplified block diagram of the architecture of the terminal of FIG. 2. A system bus (or a plurality of system buses) 36 interconnects various modules in an ATM controller 40 to allow mutual intercommunication, as will be described in more detail below.

User associated modules 42 comprise the following elements (peripheral devices): a token reader 50 in the form of a card reader, the display 26, the encrypting keypad module 28, a printer 56, and a cash dispenser 58. Some of these user associated modules 42 are part of the user interface 22 (such as the display 26 and the keypad 28), other user associated modules 42 are associated with the user interface 22 (such as the card reader 50, which is associated with, and located rearwardly of, the card entry/exit slot 32).

The controller 40 comprises modules for driving the user interface elements, namely: card reader controller 60, display controller 62, keypad controller 64, printer controller 66, and dispenser controller 68. These user associated modules (26, 28, 50, 56, and 58) and associated controllers (60 to 68) are standard modules that are used in conventional ATMs and will not be described in detail herein.

The controller 40 also comprises a BIOS 70 stored in non-volatile memory, a microprocessor 72, associated main memory 74, storage space 76 in the form of a magnetic disk drive, and a dedicated network connection 78 for connecting the ATM 14 to the transaction host 12 (FIG. 1) via the network 16.

In use, the main memory 74 is loaded with an ATM operating system kernel 80, and an ATM application 82. As is well known in the art, the operating system kernel 80 is responsible for memory, process, task, and disk management. The ATM application 82 is responsible for controlling the operation of the ATM 14, including: presenting screens on the ATM display 26, receiving data read by the card reader 50, preparing transaction requests for sending to the host 12 via the network connection 78, and receiving responses and commands from the host 12 via the network connection 78.

The term "screen" is used herein to denote the graphics, text, controls (such as menu options), and such like, that are displayed on an ATM monitor; the term "screen" as used herein does not refer to the hardware (that is, the monitor) that displays the graphics, text, controls, and such like.

If a person is unable to use an ATM or experiences difficulty in using an ATM, for example because of mobility problems or visual impairment, then that person provides the financial institution with a contact telephone number to be used during a transaction. The institution then issues that person (the account holder, also referred to herein as "the user") with a magnetic stripe card that stores a contact telephone number in addition to conventional details about the account holder and the account. The contact telephone number is the telephone number of the account holder's cellular telephone 21.

TWO PERSON TRANSACTION EXAMPLE

One example of a typical transaction at one of the ATMs 14 will now be given with reference to FIGS. 4a to 4d. In this example, the account holder wishes to withdraw cash from an ATM, and gives the card to a trusted third party, for example a friend or relative. Thus, in this example, the person entering transaction details is located remotely from the ATM 14, and a trusted third party is used to initiate the transaction at the ATM 14.

Initially, the third party approaches an ATM 14 displaying screen 100 (FIG. 4a) and inserts the card. The card reader 50 reads the magnetic stripe on the card and conveys the read details to the ATM application 82 via the card reader controller 60 and the bus 36. The ATM application 82 analyses these details and determines that the magnetic stripe stores a telephone number in addition to account details (for example, name of account, number of account, and such like).

The ATM application 82 displays screen 102 (FIG. 4b) to inform the person located at the ATM (in this example, the third party) that the transaction will be entered using a remote entry device (that is, not using the ATM's user interface 22).

The ATM application 82 then uses network connection 78 to convey a file including account details and the telephone number to the communication interface 17 in host 12. The communication interface 17 receives this file and automatically dials the telephone number and activates an audio and/or visual interface. This embodiment uses an audio interface having recorded messages and selectable options associated with numbers so that a user can select an option by depressing a number on the telephone keypad.

When the account holder answers this telephone call at the cellular telephone 21, then the account holder is first asked (by the audio interface) to enter a secure code. The secure code may be the account holder's PIN, or it may be another code (referred to herein as an access code). The access code may be a subset of a longer code. For example, the account holder may be asked to enter the second, fourth, and fifth digits/letters of their access code. This may be used to improve security in case a fraudster attempts to eavesdrop or intercept a code as it is being entered by the account holder.

Once the account holder has entered the secure code, a transaction menu is then recited to the account holder. The transaction menu may include options such as: bill payment, cash withdrawal, transfer funds between accounts, and such like.

In this example, the account holder selects the cash withdrawal option, using either speech or a button on the telephone 21.

A cash withdrawal menu is then recited to the account holder. The account holder enters the amount of cash to be withdrawn. A confirmation menu may also be recited to allow the account holder to confirm the transaction details.

The communication interface 17 then combines the transaction details and code entered by the account holder with the account details conveyed form the ATM 14 into a single transaction request file and sends the transaction request file to the authorization facility 18 for authorizing.

If the transaction request is authorized then the host 12 notifies the ATM 14 and the ATM application 82 presents a screen 104 (FIG. 4c) to the person located at the ATM (in this example, the trusted third party) to inform him/her to remove the card because cash is about to be dispensed.

The communication interface 17 may also inform the account holder via cellular telephone 21 that the transaction has been executed and that cash has been dispensed.

If the transaction request is not authorized, for example, because the secure code was incorrect or because adequate funds are not available, then the ATM application 82 presents a screen 106 (FIG. 4d) to the trusted third party to inform him/her that the transaction was not authorized.

The communication interface 17 may also inform the account holder via cellular telephone 21 that the transaction has not been authorized.

It will be appreciated that this embodiment has the advantage that an account holder can execute a transaction at an ATM without having to be present at the ATM, and without having to divulge their PIN or other secure code to enable the transaction to be executed, thereby reducing the possibility of fraud. It will also be appreciated that this embodiment has the advantage that an account holder can control a transaction in real time even though the account holder is located remotely from a terminal that fulfils the transaction.

It will also be appreciated that in the above embodiment the means for obtaining contact information for a communications device and the means for identifying a user are both implemented by the card reader 50 in conjunction with the card reader controller 60 and the ATM application 82.

ONE PERSON TRANSACTION EXAMPLE

Another example of a typical transaction at one of the ATMs 14 will now be given. In this example, the person conducting a transaction is located in the immediate vicinity of the ATM 14, and initiates the transaction at the ATM 14 by inserting the card.

The transaction proceeds in the same way as the above example, the only differences being that the account holder is present at the ATM, and the account holder removes the withdrawn cash.

Second Embodiment

Figure 5:
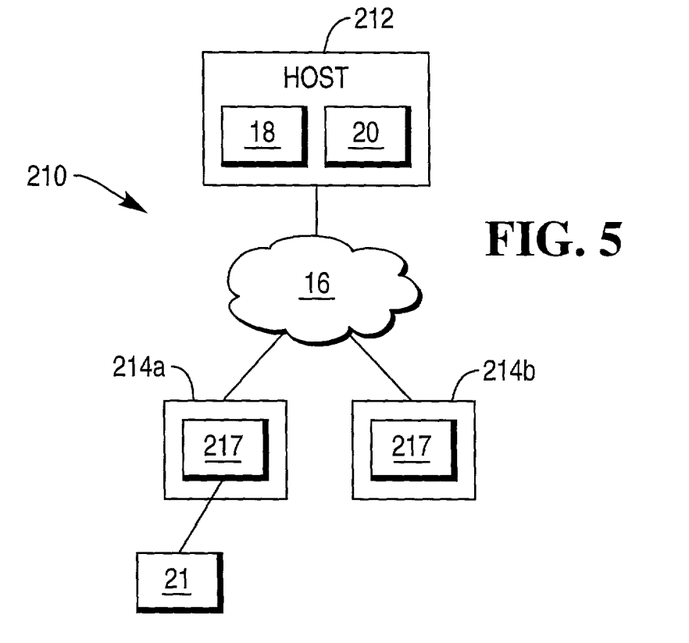
FIG. 5 is a block diagram of a self-service terminal system according to another embodiment of the present invention.
Figure 6:
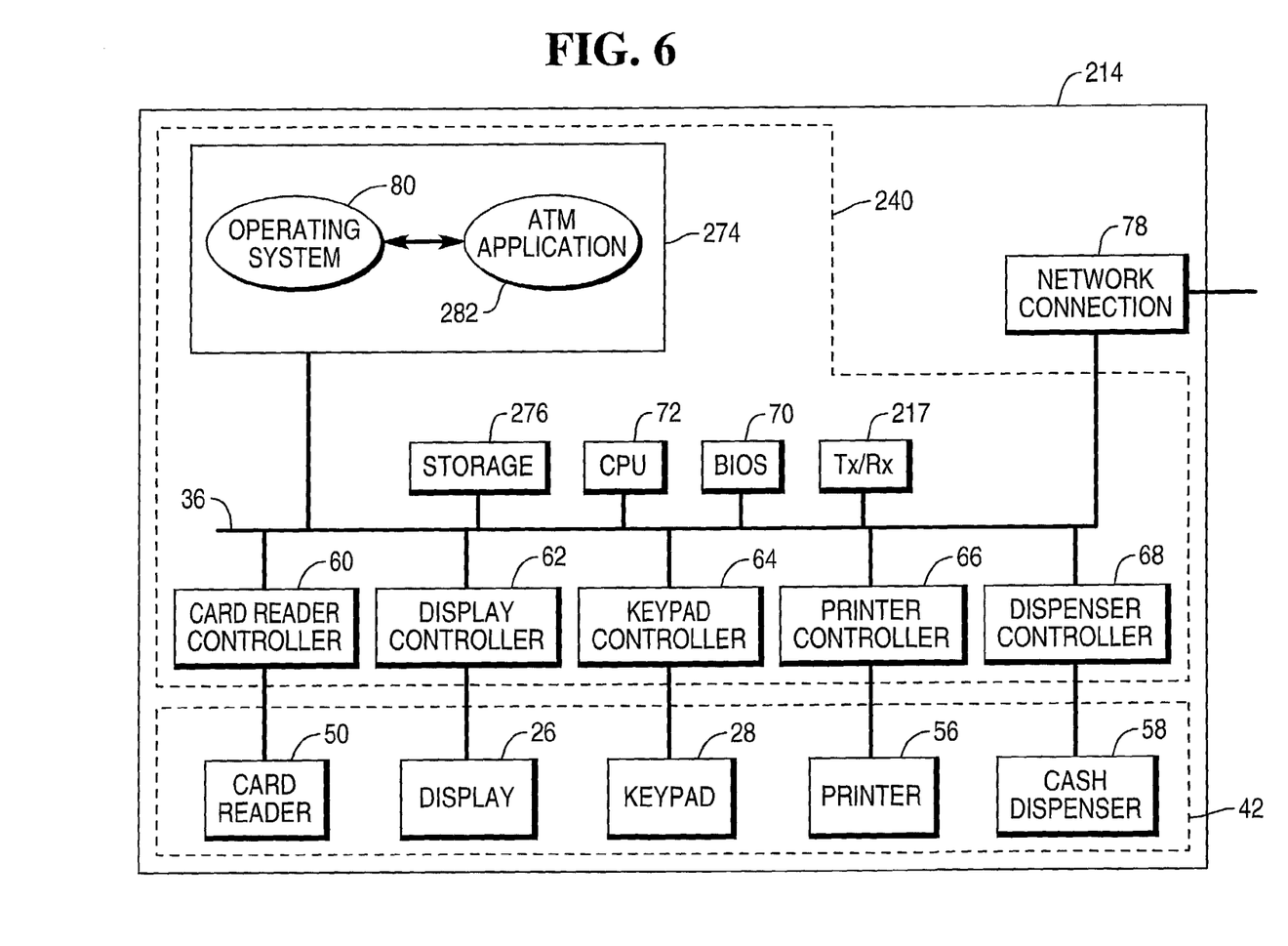
FIG. 6 is a simplified block diagram of the architecture of the terminal of FIG. 5.

Another embodiment of the present invention will now be described with reference to FIG. 5, which is a block diagram of a self-service terminal system 210 according to another embodiment of the present invention; and also with reference to FIG. 6, which is a simplified block diagram of the architecture of the terminal of FIG. 5.

The system 210 is owned and operated by a financial institution and comprises a host 212 interconnected to a plurality of SSTs 214 (only two, 214a and 214b, are shown) by a secure network 16. The SSTs 214 are ATMs. The host 212 includes an authorization facility 18 and a back-office facility 20.

The ATMs 214 are similar to ATMs 14; but the ATM controller 240 in ATMs 214 is slightly different to the ATM controller 40 in ATMs 14. In particular, ATM controller 240 includes contact means 217 in the form of a transceiver, and a modified ATM application 282.

In this embodiment, an ATM 214 communicates directly with a communications device 21 rather than via the communication interface 17. This is accomplished by the transceiver 217 dialing (under control of the ATM application 282) the communications device 21 and conveying data between the ATM application 282 and the communications device 21. When the ATM application 282 has received from the communications device 21 all data required for a transaction, the ATM application 282 obtains authorization for the transaction from the remote host 212 in a conventional manner.

In a similar way as for the previous embodiment (FIGS. 1 to 4D), this embodiment can be used by an account holder who is present at the ATM during a transaction (the one person transaction example), or by an account holder who is remote from the ATM during a transaction (the two person transaction example).

Various modifications may be made to the above described embodiments within the scope of the invention, for example, the communications device 21 may include an encryption unit for increased security. In other embodiments, the ATM application 82 or 282 may present the trusted third party with advertisements during the delay introduced by the account holder entering a transaction. In other embodiments, the person entering the transaction may be enabled to stop presentation of screens at the ATM while a transaction is being entered and executed. In other embodiments, the SST may be a non-cash kiosk.

What is claimed is:

1. An Automated Teller Machine, ATM, comprising:
a user interface including means for identifying an account of a user remote from the ATM from account identification information provided by another user at the ATM on behalf of the user remote from the ATM;
means for obtaining contact information which enables the ATM to contact a communications device associated with the user remote from the ATM; and
contact means for establishing a link with the communications device to allow the user remote from the ATM to execute a transaction using the communications device.

2. A terminal according to claim 1, wherein the means for obtaining contact information includes means for retrieving a telephone number of the communications device.

3. A terminal according to claim 1, wherein the contact means contacts the communications device directly.

4. A terminal according to claim 1, wherein the contact means requests a remote transceiver to establish a link with the communications device.

5. An Automated Teller Machine, ATM, comprising:
a user interface including means for identifying an account of a user remote from the ATM, the identifying means including a card reader for reading a card of the user presented to the card reader by another user at the ATM;
means for obtaining telephone number for a telephone associated with the user remote from the ATM; and
contact means for establishing a link with the telephone to allow the user remote from the ATM to execute a transaction using the telephone.

6. An automated teller machine (ATM) comprising:
a user interface including means for identifying an account of an ATM customer remote from the ATM from account identification information provided by a user at the ATM on behalf of the ATM customer remote from the ATM;
a cash dispenser for dispensing cash;
means for obtaining contact information which enables the ATM to contact a communications device associated with the ATM customer remote from the ATM;
means for establishing a link with the communications device based upon the obtained contact information to allow the ATM customer to enter an ATM transaction; and
means for controlling the cash dispenser to dispense cash to the user at the ATM when the entered ATM transaction requires cash to be dispensed.

7. An ATM according to claim 6, wherein the means for obtaining contact information includes means for retrieving data relating to a telephone number to be called to establish a link with the communications device associated with the ATM customer.

8. An ATM according to claim 6, wherein the contact means includes means for directly contacting the communications device associated with the ATM customer.

9. An ATM according to claim 6, wherein the contact means includes means for requesting a remote transceiver to establish a link with the communications device associated with the ATM customer.

10. An automated teller machine (ATM) comprising:
a user interface including means for identifying an account of an ATM customer remote from the ATM, the identifying means including a card reader for reading a card of the ATM customer presented to the card reader by a user at the ATM;
a cash dispenser for dispensing cash;
means for obtaining a telephone number for a telephone associated with the ATM customer remote from the ATM;
means for establishing a link with the telephone based upon the obtained telephone number to allow the ATM customer to enter an ATM transaction; and
means for controlling the cash dispenser to dispense cash to the user at the ATM when the entered ATM transaction requires cash to be dispensed.

11. A system of Automated Teller Machines, ATMs, comprising:
a host;
a group of ATMs, each having a user interface including transaction entry means and means for identifying an account of a user remote from the ATM, the identifying means including a card reader for reading a card of the user presented to the card reader by another user at the ATM;
means for obtaining contact information which enables an ATM to contact a communications device associated with the user remote from the ATM; and
contact means for contacting the communications device to allow the user remote from the ATM to execute a transaction using the communications device.

12. A method of operating an Automated Teller Machine, ATM, the method comprising the steps of:
(a) receiving account identification information associated with an account of a user remote from the ATM, the account identification information presented by another user at the ATM on behalf of the user remote from the ATM;
(b) identifying the account of the user remote from the ATM using the account identification information;
(c) obtaining contact information which enables the ATM to contact a communications device associated with the user remote from the ATM; and (d) establishing a telecommunications link with the communications device so that the user remote from the ATM can execute a transaction via the link.

13. A method according to claim 12, wherein step (c) includes the step of:
(c-1) retrieving a telephone number to be called to establish a telecommunications link with the communications device.

14. A method according to claim 12, wherein step (d) includes the step of:
(d-1) directly establishing a telecommunications link with the communications device.

15. A method according to claim 12, wherein step (d) includes the step of:
(d-1) requesting a remote transceiver to establish a telecommunications link with the communications device.

16. A method of operating an automated teller machine (ATM), the method comprising the steps of:
(a) reading a card of an ATM customer remote from the ATM, the card presented by a user at the ATM;
(b) identifying an account of the ATM customer remote from the ATM;
(c) obtaining contact information which enables the ATM to contact a communications device associated with the ATM customer remote from the ATM; and
(d) establishing a link with the communications device associated with the ATM customer remote from the ATM to allow the ATM customer to enter a transaction.

17. A method according to claim 16, wherein step (d) includes the step of:
(d-1) directly establishing the link with the communications device associated with the ATM customer.

18. A method according to claim 16, wherein step (d) includes the step of:
(d-1) requesting a remote transceiver to establish the link with the communications device associated with the ATM customer.

19. A method according to claim 16, further comprising:
(e) receiving a Personal Identification Number, PIN, associated with the account and entered by the ATM customer from the communications device prior to allowing the ATM customer to enter the transaction.

* * * * *